United States Patent [19]
Baney

[11] Patent Number: 6,023,358
[45] Date of Patent: Feb. 8, 2000

[54] APPARATUS FOR ANALYZING A MULTI-PORT OPTICAL NETWORK

[75] Inventor: Douglas M. Baney, Los Altos, Calif.

[73] Assignee: Hewlett-Packard Company, Palo Alto, Calif.

[21] Appl. No.: 08/888,473

[22] Filed: Jul. 7, 1997

[51] Int. Cl.[7] .......................... H04B 10/08; H04B 10/12; H04B 10/16; G01J 1/04
[52] U.S. Cl. ...................... 359/110; 359/110; 359/151; 359/179; 250/227.11
[58] Field of Search ............................ 359/110; 356/318, 356/319, 300; 385/123

[56] References Cited

U.S. PATENT DOCUMENTS

| | | | |
|---|---|---|---|
| 5,241,409 | 8/1993 | Hill et al. | 359/128 |
| 5,444,238 | 8/1995 | Gherardi et al. | 250/227.11 |
| 5,574,588 | 11/1996 | Kawanishi et al. | 359/158 |
| 5,771,250 | 6/1998 | Shigehara et al. | 372/6 |

*Primary Examiner*—Jason Chan
*Assistant Examiner*—Mohammad Sedighian

[57] ABSTRACT

An optical interface device for applying a light signal to a port of device under test and analyzing the signals leaving each of the ports on the device. The device to be tested has at least two such ports. An interface device according to the present invention includes a plurality of optical couplers having first, second, third, and forth ports. Each of the optical couplers transfers a first fraction of a first optical signal received at the first port to the second port and a second fraction of that optical signal to the third port. In addition, each of the couplers transfers a fixed fraction of a second optical signal entering the second port to the fourth port. There is one such optical coupler for each of the ports of the device to be tested at any given time, the second port of that optical coupler being coupled to that port during testing. The interface device also includes a first multiplexer coupled to the first ports of the optical couplers for receiving a stimulus light signal and coupling the stimulus light signal to one of the optical couplers. One embodiment of the invention includes a second multiplexer for connecting the third ports of the optical couplers to a test device for analyzing the stimulus signal input to the first ports of the optical couplers. In a third embodiment of the invention, a third multiplexer is used to connect the fourth ports of the optical couplers to a test device for analyzing light signals received on the second ports of the optical couplers.

6 Claims, 3 Drawing Sheets

FIGURE 3

APPARATUS FOR ANALYZING A MULTI-PORT OPTICAL NETWORK

FIELD OF THE INVENTION

The present invention relates to an apparatus for analyzing the response of optical devices, and more particularly, to an apparatus for analyzing a two port optical device without requiring that the device be reconnected during the measurement process.

BACKGROUND OF THE INVENTION

There are a large number of optical devices that have two or more ports which receive and transmit light signals. Optical filters, amplifiers, and multiplexers are but a few examples of such devices. Equipment and protocols for efficiently testing such devices are required both in research and manufacturing.

To simplify the following discussion, consider the case of a two-port device such as an optical amplifier. To characterize the device, a signal is applied to a first port and the output from the second port together with the signal reflected back from the first port are analyzed. In addition, the power of the input signal is also monitored. After the first port has been characterized, the roles of the two ports are reversed.

In prior art systems, the ports are reversed by disconnecting and reconnecting the device under test to the measurement equipment. Connections in optical lines are much more problematic than those in electrical circuitry. If the connecting optical line has a fusion connection, the lines must be cut and then refused. This is a time consuming process which is to be avoided if possible. Alternatively, mechanical couplers can be used to make the connections. Unfortunately, the reliability of such coupling devices is poor, and hence, one cannot be sure that the characterization of the device under test is not altered by the properties of the mechanical connection.

These difficulties are even more pronounced in the testing of optical devices having more than two ports. Since each port must be tested as an input port as well as an output port, the number of reconnections required to test a device grows rapidly with the number of ports.

Broadly, it is the object of the present invention to provide an improved apparatus and method for characterizing optical devices.

It is a further object of the present invention to provide an apparatus that does not require reconnection of the test equipment during the characterization of the device.

It is a still further object of the present invention to provide a device that can be utilized in testing optical devices having more than two ports.

These and other objects of the present invention will become apparent to those skilled in the art from the following detailed description of the invention and the accompanying drawings.

SUMMARY OF THE INVENTION

The present invention is an optical interface device for applying a light signal to a port of device under test and analyzing the signals leaving each of the ports on the device. The device to be tested has at least two such ports. An interface device according to the present invention includes a plurality of optical couplers having first, second, third, and forth ports. Each of the optical couplers transfers a first fraction of a first optical signal received at the first port to the second port and a second fraction of that optical signal to the third port. In addition, each of the coupler transfers a fixed fraction of a second optical signal entering the second port to the fourth port. There is one such optical coupler for each of the ports of the device to be tested at any given time, the second port of that optical coupler being coupled to that port during testing. The interface device also includes a first multiplexer coupled to the first ports of the optical couplers for receiving a stimulus light signal and coupling the stimulus light signal to one of the optical couplers. One embodiment of the invention includes a second multiplexer for connecting the third ports of the optical couplers to a test device for analyzing the stimulus signal input to the first ports of the optical couplers. In a third embodiment of the invention, a third multiplexer is used to connect the fourth ports of the optical couplers to a test device for analyzing light signals received on the second ports of the optical couplers.

DETAILED DESCRIPTION OF THE INVENTION

Figure 1:
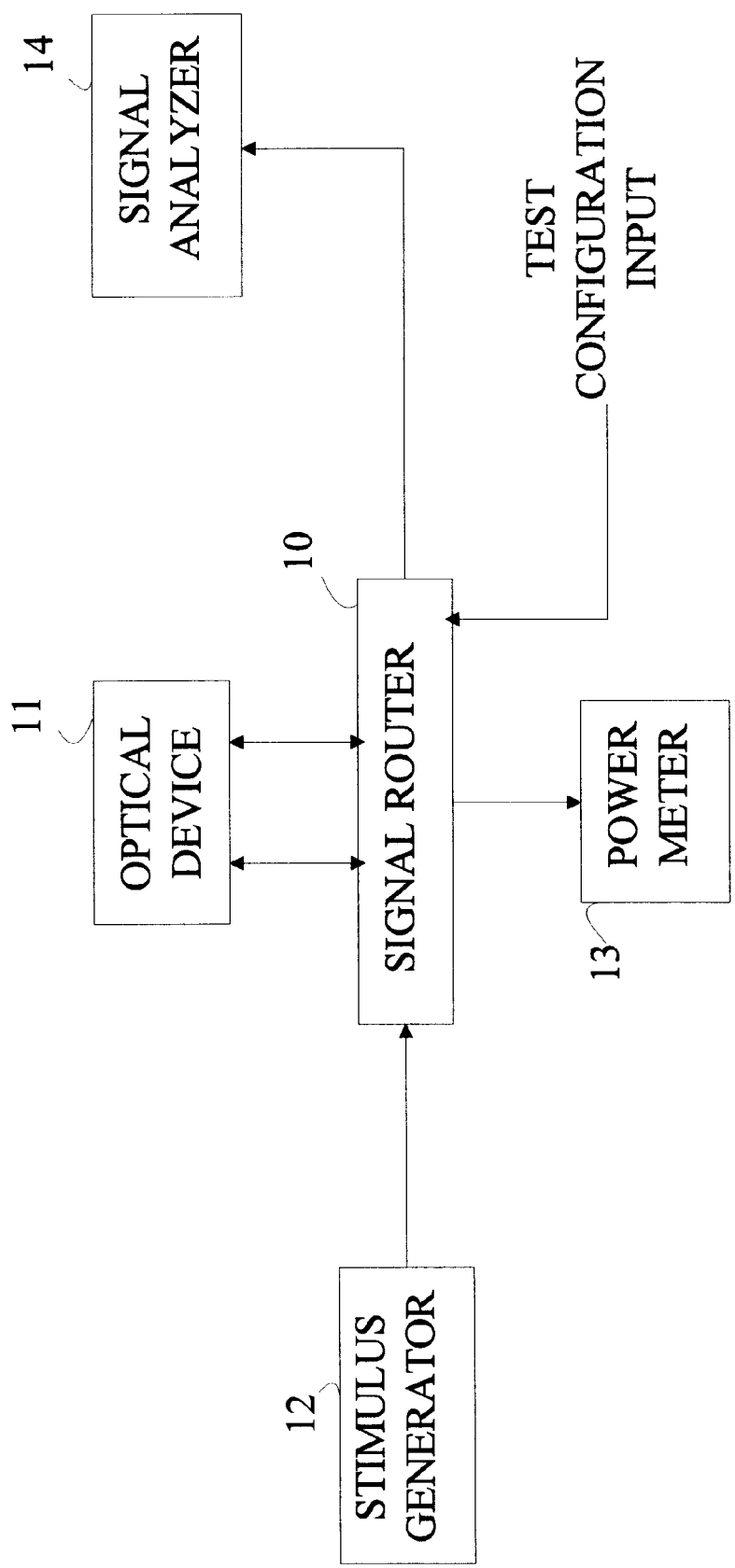
FIG. 1 is a block diagram of a signal router according to the present invention connected to an optical device which is to be characterized.

The present invention may be viewed as signal router for applying one or more simulus signals to an optical device under test and for collecting the signals leaving the ports of the device under test and applying those signals to various test systems. The present invention may be more easily understood with reference to FIG. 1 which is a block diagram of a signal router 10 according to present invention connected to an optical device 11. For simplicity, optical device 11 is assumed to have only two ports. To further simplify the discussion, it will also be assumed that only one input signal is applied to device 11 at any one time. The stimulus signal is generated by an optical signal generator 12. Router 10 applies this signal to the input port of device 11 specified by the test configuration input. A portion of the stimulus signal is routed to a power meter 13 which measures the actual power applied to device 11. The signals representative of the signals leaving device 11 are routed to signal analyzer 14. In the simplified embodiment shown in FIG. 1, signal analyzer 14 has only one input. The specific port whose output is routed to signal analyzer 14 is determined by the test configuration input.

The stimulus source provides the input light signals for testing device 11. It is to be understood that the present invention may be utilized with any form of light signal generator. For example, the light signal generated by the stimulus source may be incoherent or coherent. The light may be continuous, modulated, or a combination of both. The light signals may also be analog or digital. The signals may also be a combination of a number of signals that are wavelength division multiplexed or time-domain multiplexed, or any combination thereof.

Similarly, the present invention may be utilized with any form of light signal analyzer. For the purposes of the present discussion, an analyzer will be defined to be any device, or ensemble of devices, which provide information about a signal presented to a port on the device. For example, the information may be signal strength as a function of wavelength, chromatic dispersion, distortion as measured in either the time domain, or frequency domain, reflection level, etc.

Figure 2:
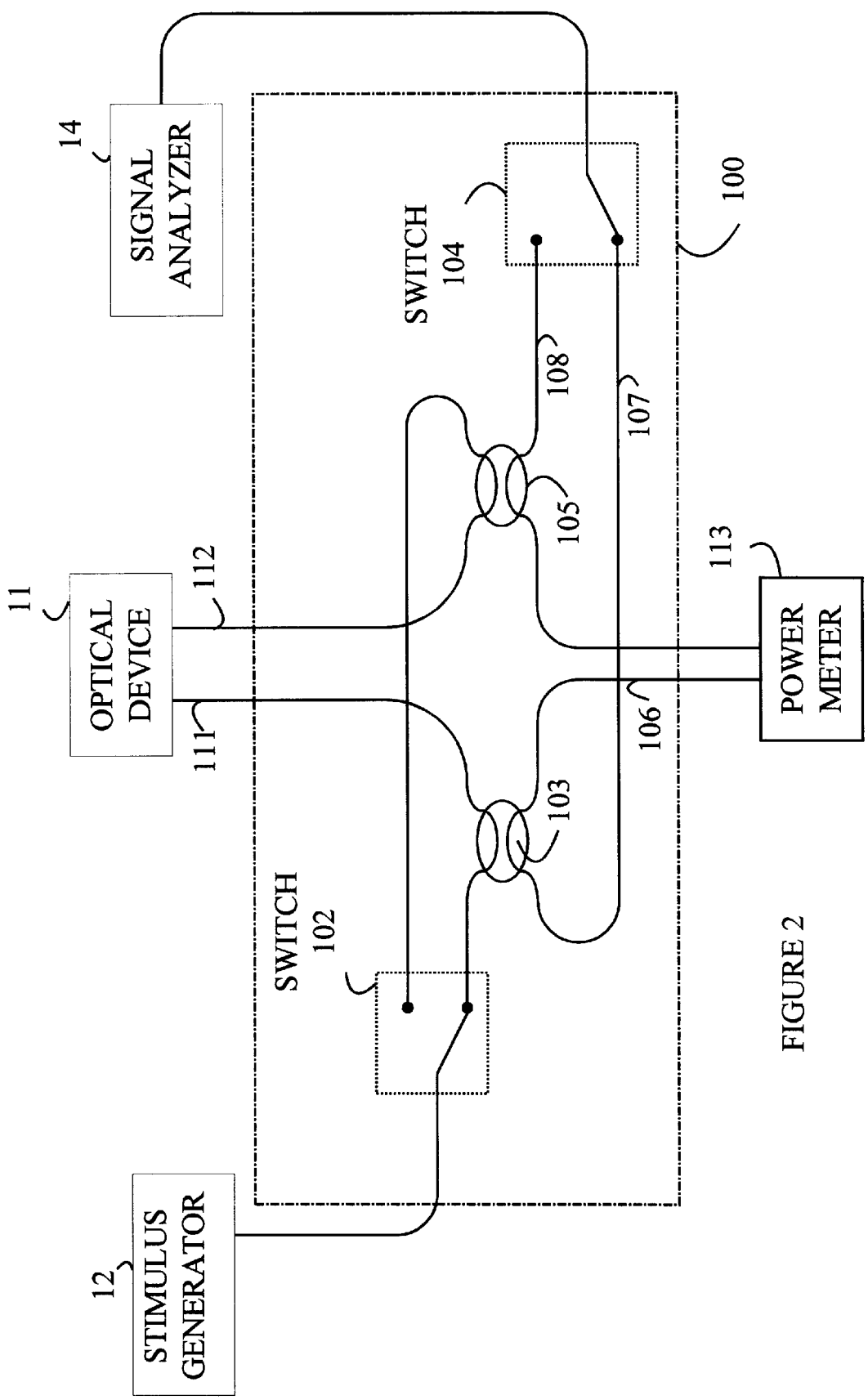
FIG. 2 is a schematic drawing of one embodiment of an optical signal router according to the present invention.

Refer now to FIG. 2 which is a schematic drawing of one embodiment of an optical signal router 100 according to the present invention. Router 100 is adapted for the testing of two port devices and assumes that power meter 113 has a built in multiplexer for selecting one of its two input ports as the current input. Alternatively, power meter 113 could be a two channel power meter. Router 100 is constructed from two optical couplers 103 and 105 and two optical switches shown at 102 and 104. The optical input signal generated by stimulus generator 12 is applied to either port 111 or port 112 of device 11. As shown in FIG. 2, switch 102 is set to apply the optical input signal to port 111 via coupler 103. Coupler 103 splits the input signal, sending part of the signal to port 111 and the other part to power meter 113 via optical fiber 106. Similarly, a fixed fraction of the signal returning from device 111 via port 111 is coupled by coupler 103 to fiber 107.

Coupler 105 performs a similar set of functions with reference to port 112. When switch 102 is set in the alternative position to that shown in FIG. 2, the signal from stimulus generator 12 is coupled to power meter 113 and port 112. A fixed fraction of the signal leaving port 112 is coupled to fiber 108. The signal presented to analyzer 14 is selected by switch 104.

It should be noted that any differences in the transfer characteristics of switch 102 can be removed by observing the power actually delivered to the device under test utilizing power meter 113. Hence, the difficulties normally associated with non-fusion connections may be eliminated. Similarly, the transfer characteristics of switch 104 are independent of the device under test and the connections thereto, and hence, can also be calibrated.

Figure 3:
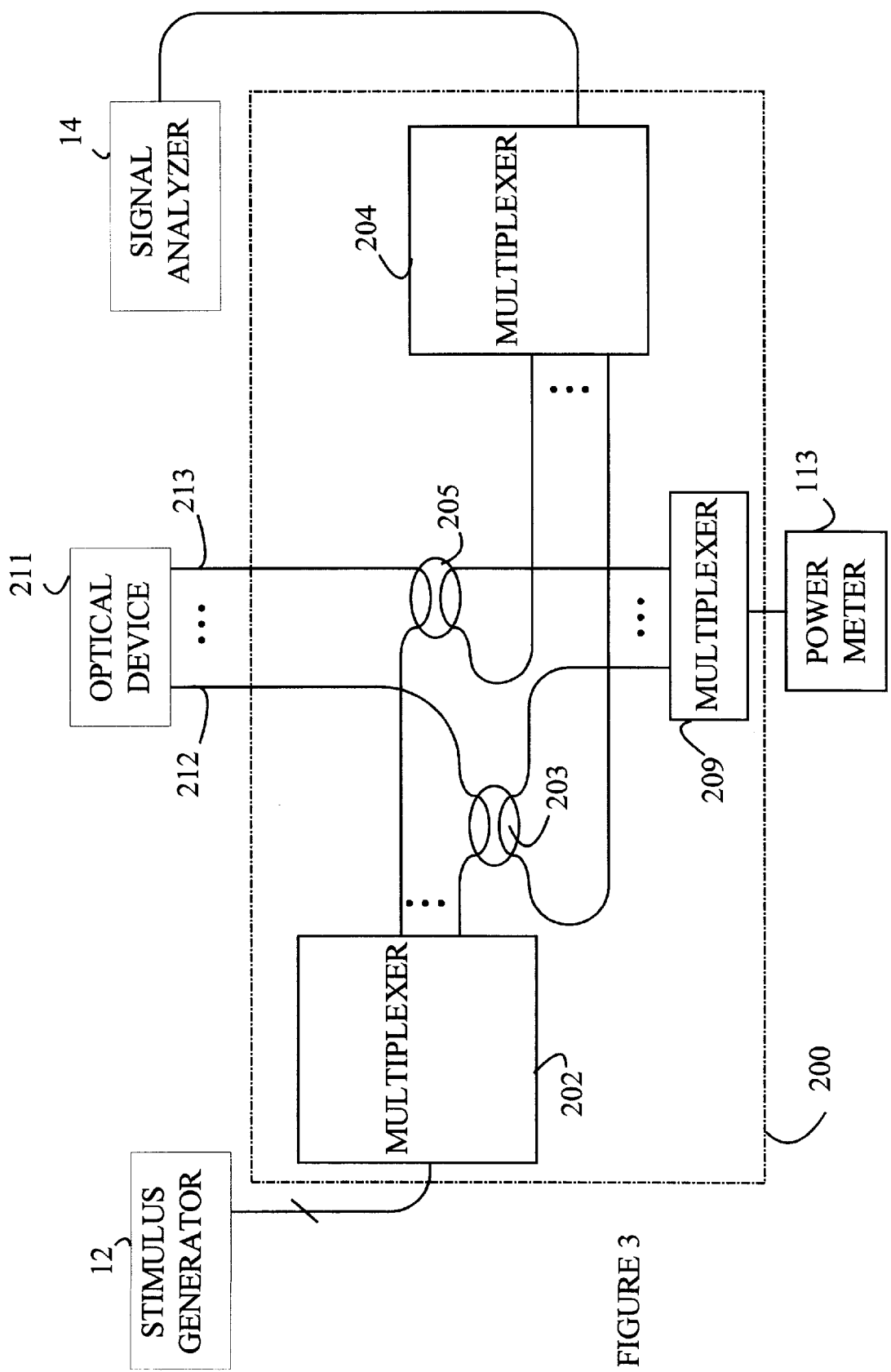
FIGS. 3 is a schematic drawing of another preferred embodiment of an optical signal router according to the present invention.

Refer now to FIG. 3 which illustrates the manner in which an optical router 200 according to the present invention can be utilized to provide an optical interface for testing an optical device 211 having two or more ports. Denote the number of ports on device 211 by N. Exemplary ports are shown at 212 and 213. For simplicity, it will be assumed that only one of these ports receives a stimulus at any one time and that the signals leaving each port are analyzed one at a time. More complex input and output configurations will be discussed below.

Router 200 includes an optical coupler for each port of device 211. The optical couplers corresponding to ports 212 and 213 are shown at 203 and 205, respectively. Each optical coupler has four ports. The first two ports couple an input signal to the corresponding port of device 211. The third port couples a fixed fraction of the input signal coupled to the optical device to a power meter for monitoring the signal being applied to the device. The remaining port couples a fixed fraction of the light leaving the corresponding port for analyzing the output of that port.

To simplify the following discussion, the port that receives light from the simulus generator for coupling to the device under test will be referred to as the optical input port. The port that is connected to the device under test will be referred to as the device port. The port used to monitor the input signal from the stimulus generator will be referred to as the input signal monitoring port. Finally, the port used to monitor the light leaving the device under test will be referred to as the analyzer port.

In the embodiment of the present invention shown in FIG. 3, the input ports are connected to a multiplexer 202 which determines which port of device 211 receives the input signal. The analyzer ports are connected to a second multiplexer 204 which determines which port is currently connected to signal analyzer 14. Finally, the input signal monitoring ports are connected to a multiplexer 209 which selects the port that is monitored by power meter 113. It should be noted that power meters often include an input multiplexer. In such cases, multiplexer 209 is not needed. In general, multiplexers 202 and 209 will be ganged so that the power meter 113 is always tuned to the device port to which multiplexer 202 is providing the input signal.

The above discussion assumed that only one port was being monitored at a time, and only one port was receiving a stimulus signal at a time. However, embodiments in which multiple ports are stimulated may be constructed by replacing the 1:N multiplexer shown at 202 with a multiplexer that maps one or more input lines to one or more output lines. If multiple input lines having different signals are to be used, then stimulus generator 12 must be replaced by a device that provides the different input signals. Accordingly, the input line to multiplexer 202 is shown as a cable having multiple lines.

Similarly, multiplexer 204 can be replaced by a multiplexer that has multiple output lines so that multiple ports may be connected to the analyzer at the same time. In such a case, analyzer 14 would need to be replaced by an analyzer that has multiple input ports. Optical multiplexers for coupling multiple signals may be constructed from a plurality of 1:N multiplexers which are well known in the optical arts and hence will not be discussed in more detail here.

The preferred embodiments of the present invention provide optical outputs for measuring the power actually delivered to the device under test. However, it will be apparent to those skilled in the art that embodiments that lack this feature may also be utilized. If the input multiplexer 202 is reproducible and well characterized, the power measurements will not be needed.

The above described embodiments of the present invention have utilized optical couplers to connect the stimulus generator, device under test, and signal analyzers. However, it will be apparent to those skilled in the art that other forms of signal splitting devices may be utilized. For example, optical circulators may be used in place of the optical couplers shown above. Accordingly, the term "optical coupler" is defined to encompass any device which partitions light entering a first port between second and third ports.

Various modifications to the present invention will become apparent to those skilled in the art from the foregoing description and accompanying drawings. Accordingly, the present invention is to be limited solely by the scope of the following claims.

What is claimed is:

1. An optical interface device for applying a light signal to a port of a device to be tested, said optical interface device including N such ports where N>1, said optical interface device comprising:

a plurality of optical couplers having first, second, and third ports, each optical coupler transferring a first fraction of a first optical signal received at said first port to said second port, each coupler further coupling a fixed fraction of a second optical signal entering said second port to said third port, wherein said interface device comprises one of said optical couplers for each of said ports of said device to be tested at any given time, said second port of that optical coupler being coupled to that port of said device to be tested during testing; and a first multiplexer having an input port and N output ports, said output ports being coupled to said first ports of said optical couplers said first multiplexer receiving a stimulus light signal on said input port thereof and coupling said stimulus light signal to one of said output ports thereof, said first multiplexer having N states, wherein in each state, said multiplexer couples said stimulus light signal to a different one of said optical couplers.

2. An optical interface device for applying a light signal to a port of a device to be tested, said optical interface device including N such ports where N>1, said optical interface device comprising:

a plurality of optical couplers having first, second, and third ports, each optical coupler transferring a first fraction of a first optical signal received at said first port to said second port, each coupler further coupling a fixed fraction of a second optical signal entering said second port to said third port, wherein said interface device comprises one of said optical couplers for each of said ports of said device to be tested at any given time, said second port of that optical coupler being coupled to that port of said device to be tested during testing; and a first multiplexer having an input port and N output ports said output ports being coupled to said first ports of said optical couplers, said first multiplexer receiving a stimulus light signal on said input port thereof and coupling said stimulus light signal to one of said output ports thereof, wherein one of said optical couplers comprises a fourth port, said optical coupler transferring a second fraction of said first optical signal to said fourth port.

3. An optical interface device for applying a light signal to a port of a device to be tested, said optical interface device including N such ports where N>1, said optical interface device comprising:

a plurality of optical couplers having first, second and third ports each optical coupler transferring a first fraction of a first optical signal received at said first port to said second port, each coupler further coupling a fixed fraction of a second optical signal entering said second port to said third port wherein said interface device comprises one of said optical couplers for each of said ports of said device to be tested at any given time, said second port of that optical coupler being coupled to that port of said device to be tested during testing, and a first multiplexer having an input port and N output ports, said output ports being coupled to said first ports of said optical couplers, said first multiplexer receiving a stimulus light signal on said input port thereof and coupling said stimulus light signal to one of said output ports thereof, wherein said first multiplexer simultaneously couples said stimulus light signal to a second one of said optical couplers.

4. An optical interface device for applying a light signal to a port of a device to be tested, said optical interface device including N such ports where N>1, said optical interface device comprising:

a plurality of optical couplers having first, second, and third ports, each optical coupler transferring a first fraction of a first optical signal received at said first port to said second port, each coupler further coupling a fixed fraction of a second optical signal entering said second port to said third port, wherein said interface device comprises one of said optical couplers for each of said ports of said device to be tested at any given time, said second port of that optical coupler being coupled to that port of said device to be tested during testing; and a first multiplexer having an input port and N output ports, said output ports being coupled to said first ports of said optical couplers, said first multiplexer receiving a stimulus light signal on said input port thereof and coupling said stimulus light signal to one of said output ports thereof, wherein said first multiplexer further comprises a port for receiving a second stimulus signal and wherein said first multiplexer simultaneously couples said second stimulus signal to a second one of said optical couplers.

5. The optical interface device of claim 2 further comprising:

a second multiplexer for connecting said fourth ports of said optical couplers to a test device for analyzing said stimulus signal input to said first ports of said optical couplers.

6. An optical interface device for applying a light signal to a port of a device to be tested, said optical interface device including N such ports where N>1, said optical interface device comprising:

a plurality of optical couplers having first, second, and third ports, each optical coupler transferring a first fraction of a first optical signal received at said first port to said second port, each coupler further coupling a fixed fraction of a second optical signal entering said second port to said third port, wherein said interface device comprises one of said optical couplers for each of said ports of said device to be tested at any given time, said second port of that optical coupler being coupled to that port of said device to be tested during testing; and a first multiplexer having an input port and N output ports, said output ports being coupled to said first ports of said optical couplers, said first multiplexer receiving a stimulus light signal on said input port thereof and coupling said stimulus light signal to one of said output ports thereof; and a third multiplexer for connecting said third ports of said optical couplers to a test device for analyzing light signals received on said second ports of said optical couplers.

* * * * *